United States Patent [19]

Lee et al.

[11] Patent Number: 5,001,694
[45] Date of Patent: Mar. 19, 1991

[54] TRACKING AND FOCUS ACTUATOR FOR A HOLOGRAPHIC OPTICAL HEAD

[75] Inventors: Wai-Hon Lee, Cupertino; David I. Cullumber, Chester, both of Calif.

[73] Assignee: Pencom International Corp., Sunnyvale, Calif.

[21] Appl. No.: 209,148

[22] Filed: Jun. 17, 1988

Related U.S. Application Data

[63] Continuation-in-part of Ser. No. 141,459, Jan. 18, 1988, Pat. No. 4,918,675, which is a continuation-in-part of Ser. No. 938,085, Dec. 4, 1986, Pat. No. 4,794,585, which is a continuation-in-part of Ser. No. 860,154, May 6, 1988, Pat. No. 4,731,772.

[51] Int. Cl.[5] .............................................. G11B 7/00
[52] U.S. Cl. ................................. 369/44.16; 369/112
[58] Field of Search .......................... 369/32, 44–46, 369/112, 44.15, 44.16; 350/252, 255, 486

[56] References Cited

U.S. PATENT DOCUMENTS

| | | | |
|---|---|---|---|
| 3,969,574 | 7/1976 | Janssen et al. | 369/44 |
| 4,003,059 | 1/1977 | Sugiura et al. | |
| 4,021,101 | 5/1977 | Camerik | |
| 4,092,529 | 5/1978 | Aihara et al. | |
| 4,135,083 | 1/1979 | Van Alem et al. | |
| 4,135,206 | 1/1979 | Kleuters et al. | |
| 4,193,091 | 3/1980 | Kleuters et al. | |
| 4,252,412 | 2/1981 | Camerik | |
| 4,302,830 | 11/1981 | Hamoaka et al. | |
| 4,321,701 | 3/1982 | Arquie et al. | |
| 4,322,838 | 3/1982 | Neumann | 369/45 |
| 4,367,543 | 1/1983 | Araki et al. | |
| 4,386,823 | 6/1983 | Musha | |
| 4,394,755 | 7/1983 | Gijzen | 369/45 |
| 4,403,243 | 9/1983 | Hakamada | |
| 4,437,177 | 3/1984 | Watabe et al. | |
| 4,472,024 | 9/1984 | Konomura et al. | |
| 4,479,051 | 10/1984 | Musha | |
| 4,482,988 | 11/1984 | Tsurushima et al. | |
| 4,525,030 | 6/1985 | Montagu et al. | |
| 4,538,882 | 9/1985 | Tanaka et al. | |
| 4,540,240 | 9/1985 | Kadi | |
| 4,545,046 | 10/1985 | Jansen et al. | 369/44 |
| 4,557,564 | 12/1985 | van Rosmalen | |
| 4,587,466 | 5/1986 | Berg et al. | |
| 4,604,753 | 8/1986 | Sawai | |
| 4,616,355 | 10/1986 | Kasahara | 369/45 |
| 4,641,296 | 2/1987 | Mizunoe et al. | 369/45 |
| 4,669,070 | 3/1987 | Bell | 369/44 |
| 4,669,073 | 5/1987 | Wakabayashi et al. | 369/45 |
| 4,757,197 | 7/1988 | Lee | |
| 4,769,800 | 9/1988 | Moser et al. | 369/45 |
| 4,794,580 | 12/1988 | Ikedo et al. | 369/44 |
| 4,834,485 | 5/1989 | Lee | |
| 4,847,848 | 7/1989 | Inoue et al. | |
| 4,906,839 | 3/1990 | Lee | |

*Primary Examiner*—Donald McElheny, Jr.
*Attorney, Agent, or Firm*—Townsend and Townsend

[57] ABSTRACT

An actuator for an objective lens in an optical head which provides a compact structure that does not move the laser beam relative to the objective lens in the tracking mode. The low profile optical head design is accomplished by designing the optical beam path in the same space occupied by the tracking and focusing motor. A mirror reflects a laser beam from a laser at an angle to an objective lens. The objective lens and the mirror are coupled together in a manner allowing movement of the objective lens relative to the mirror along the path of a laser beam from the mirror to the objective lens. The objective lens, mirror and the coupling mechanism are all moved along the path of the laser beam between laser and the mirror for tracking control. Because the mirror moves with the objective lens, there is no beam clipping or beam distortion. For focusing, the objective lens is moved relative to the mirror. The laser, the detector and their associated optics are stationary, with only the mirror and objective lens being moved, thus limiting the mass moved and the power requirements. The simple structure eliminates the need for a fiber optic cable.

18 Claims, 6 Drawing Sheets

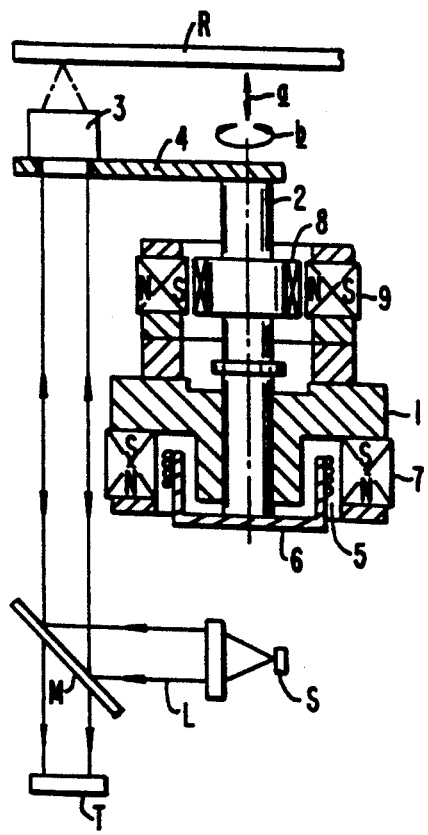
FIG._1. PRIOR ART
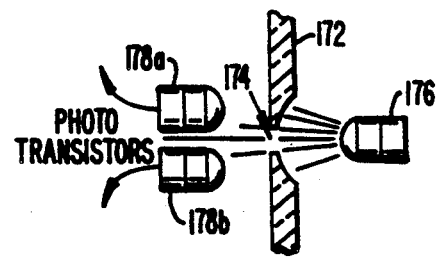
FIG._3. PRIOR ART
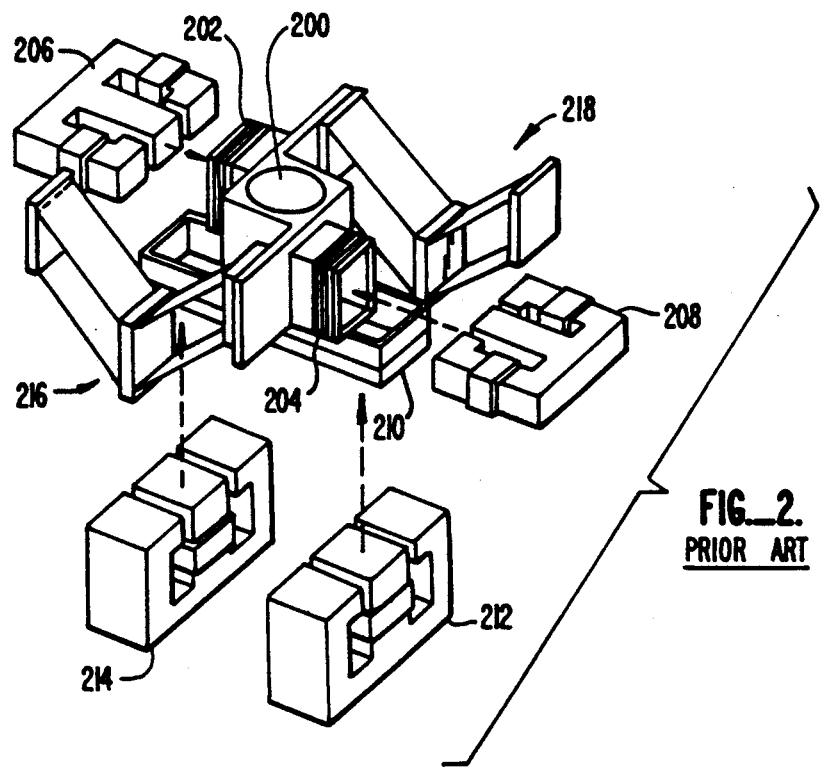
FIG._2. PRIOR ART

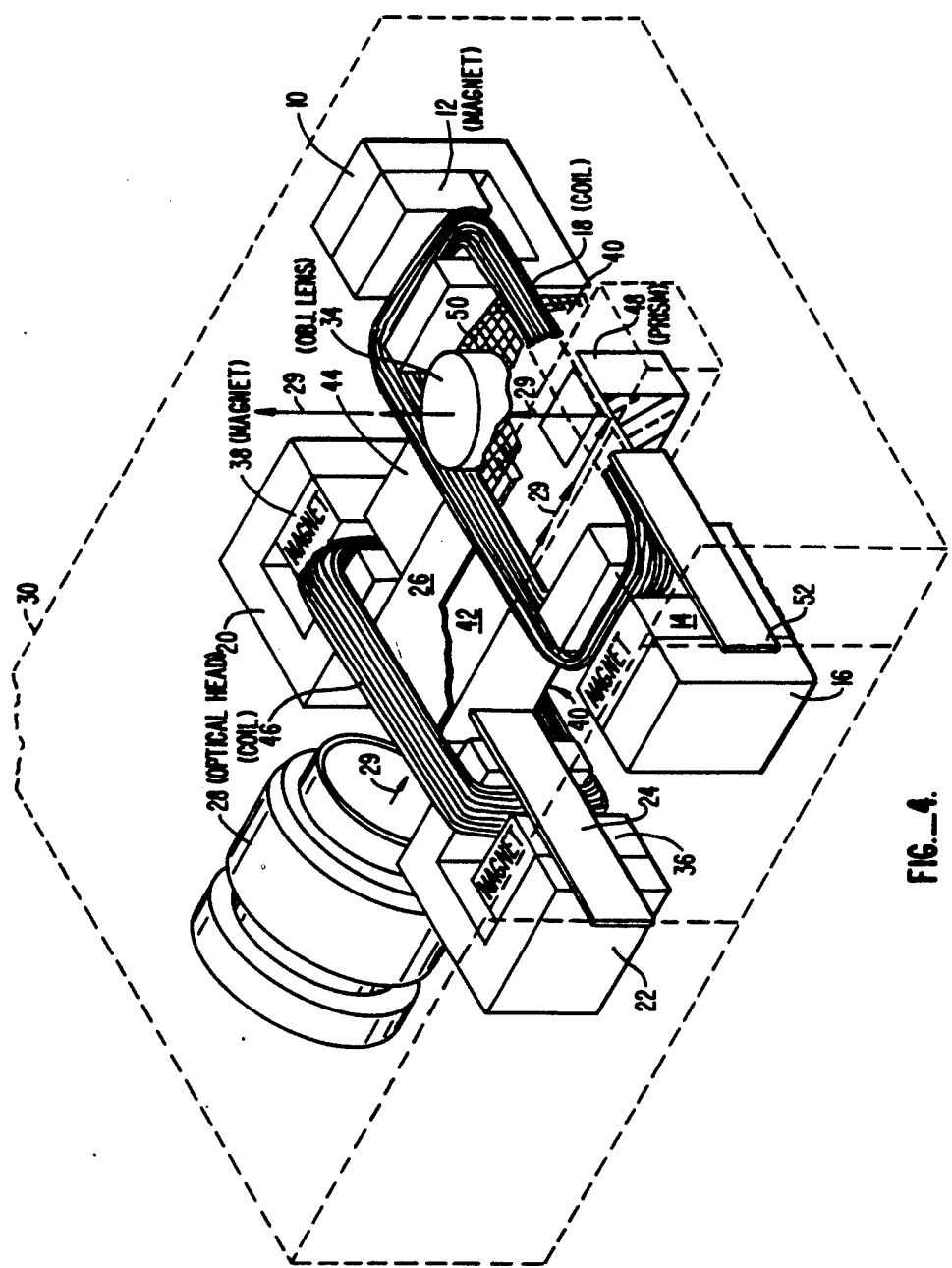
FIG._4.

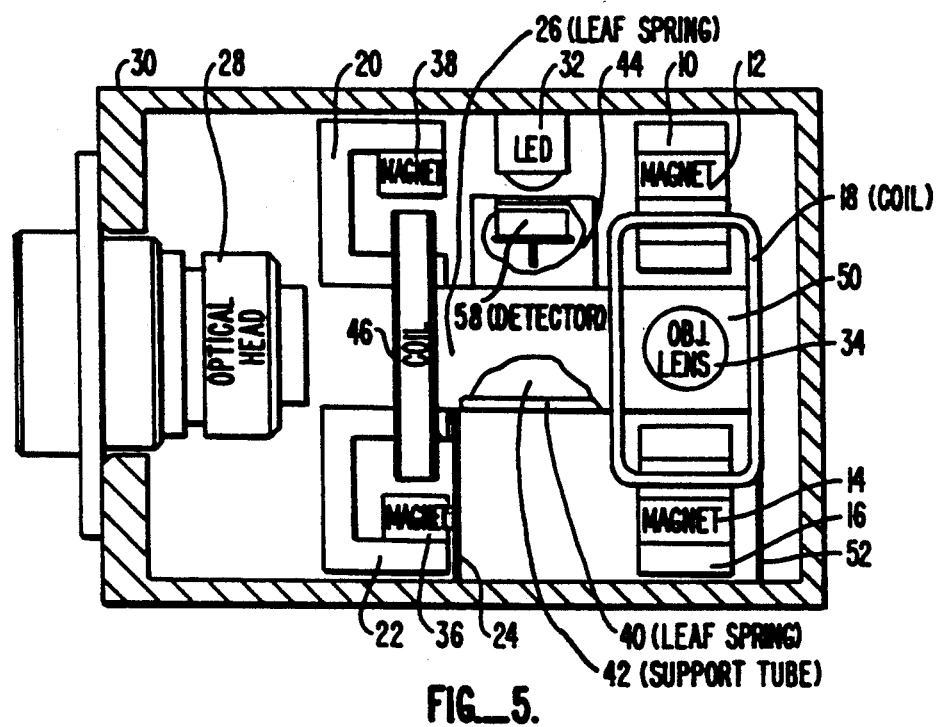
FIG._5.
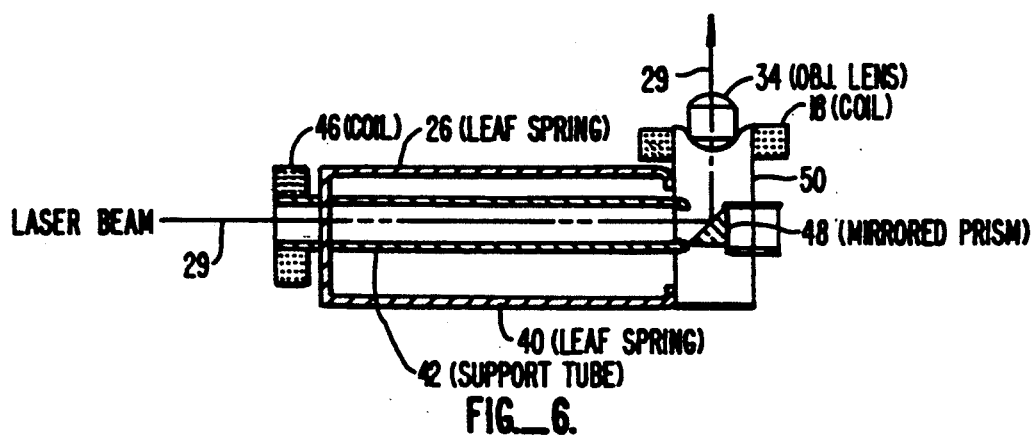
FIG._6.

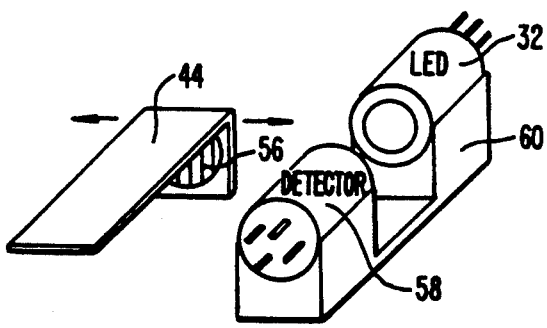
FIG._7.
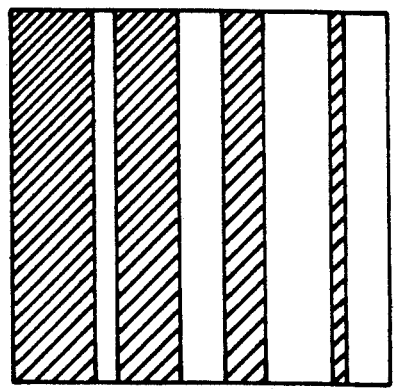
FIG._8A.
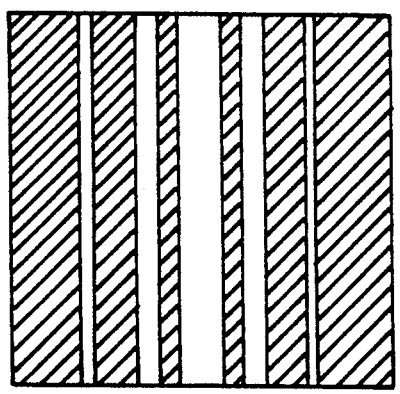
FIG._9A.
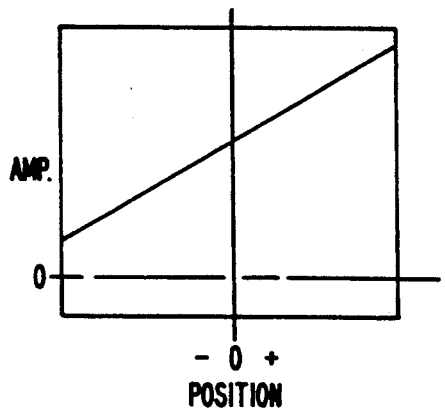
FIG._8B.
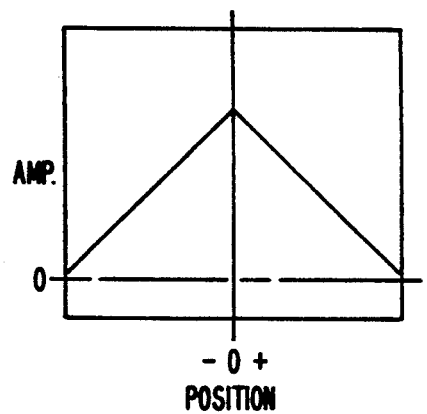
FIG._9B.

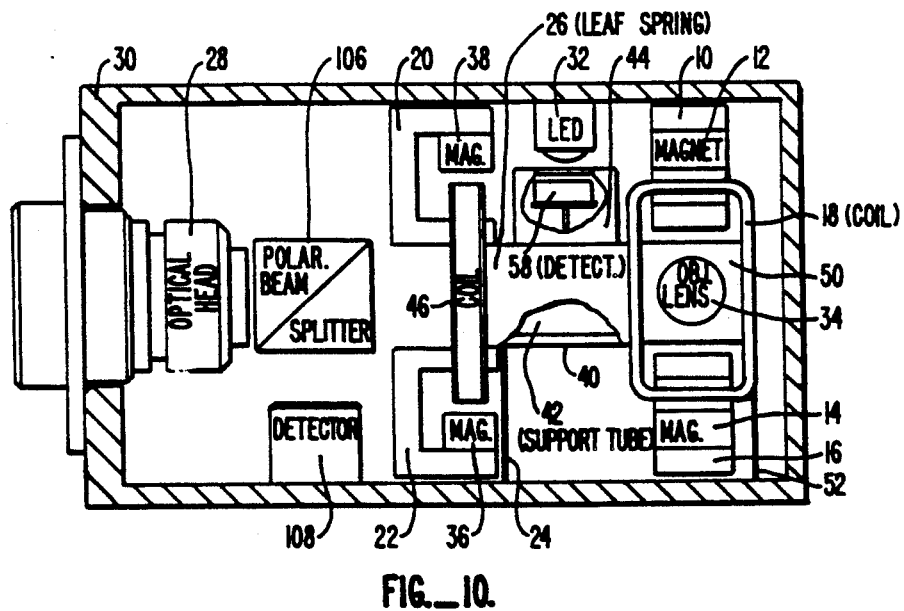
FIG._10.
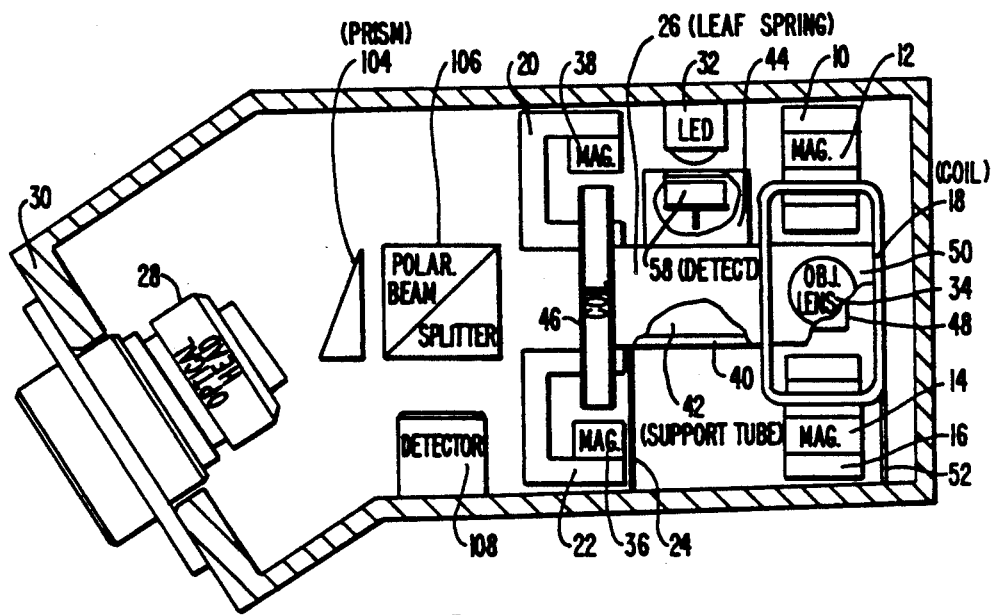
FIG._11.

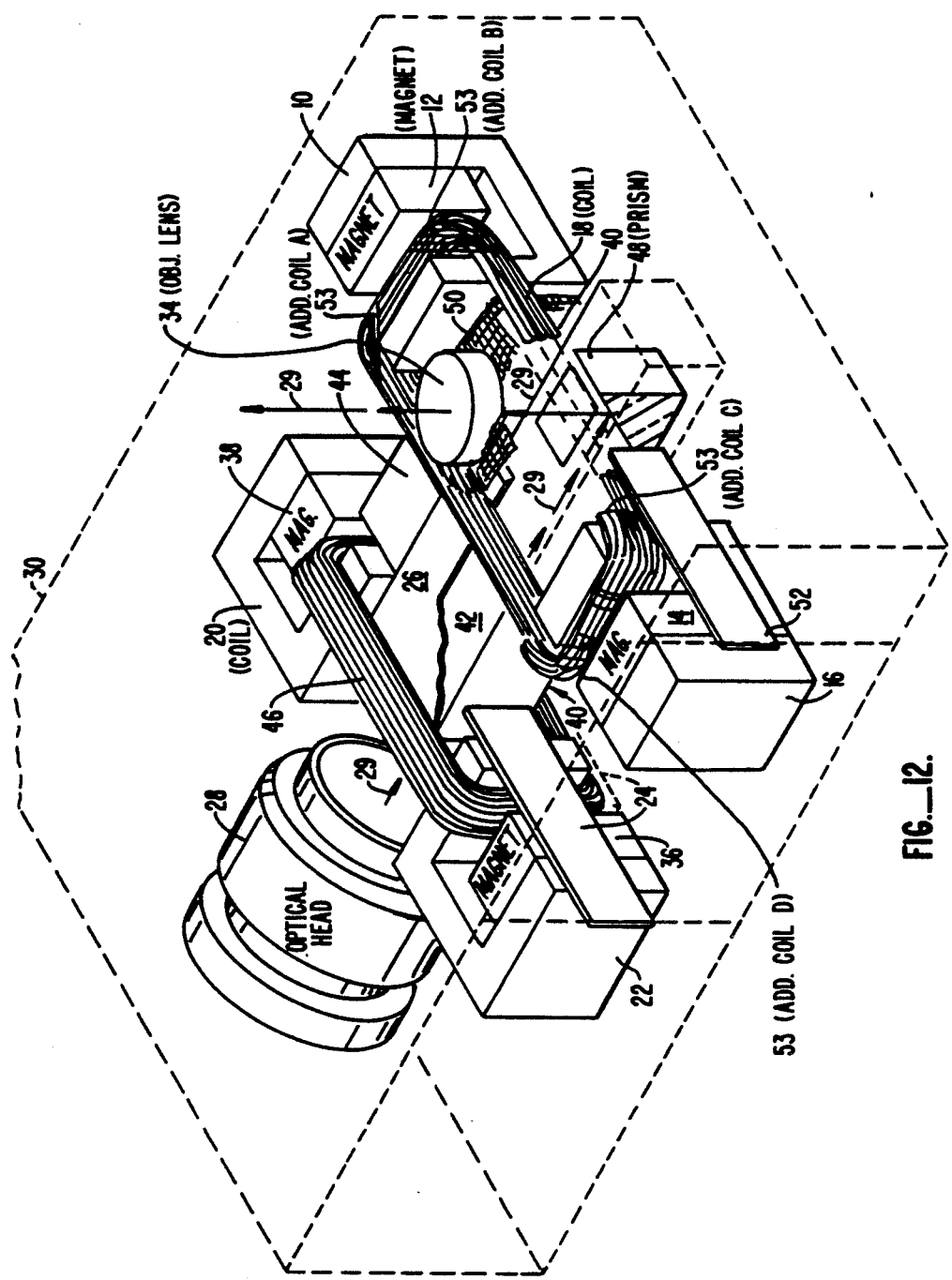
FIG._12.

TRACKING AND FOCUS ACTUATOR FOR A HOLOGRAPHIC OPTICAL HEAD

This is a continuation-in-part of application Ser. No. 141,459 filed Jan. 18, 1988, now U.S. Pat. No. 4,918,675 which is a continuation-in-part of application Ser. No. 938,085 filed Dec. 4, 1986, now U.S. Pat. No. 4,794,585, which is a continuation-in-part of application Ser. No. 860,154 filed May 6, 1988, now U.S. Pat. No. 4,731,772.

BACKGROUND

This invention relates to an optical head device for use in data recording and retrieval systems, and in particular to a tracking and focus actuator for moving an objective lens.

Optical heads produce a focused beam of light on a medium containing information and detect the light from the medium to determine the information content of the medium. At the same time, a two-dimensional optical positioning mechanism or actuator is also incorporated in the optical heads to place and focus a light beam within a specific track on a rotating piece of optical media. The tracks or grooves on the optical media can be continuous or concentric in nature. An arm is used to move the optical head to the proper track, with the actuator focusing the light beam and compensating for small variations of the track without requiring the whole arm to be moved. The main task of the actuator is to keep the in the center of the groove and to provide a focused spot with a diameter determined by the numerical aperture of an objective lens which focuses the beam on the media.

Many actuators move only the objective lens and a portion of the optics relative to the rest of the optical head. A defocused spot will reduce the power density of the laser beam, which is required to provide the proper localized heating during the writing process. It also reduces the signal contrast during reading. Tracking in the center of the groove is the other feature that is of importance. If the beam is not in the center of the groove during the write operation, the read operation might not detect any information at all. With this in mind, it is imperative that the laser beam be properly focused and positioned during reading and writing operations.

This is complicated by the fact that the rotating medium has a certain amount of axial and radial run-out. The actuator must have the capability to follow these cyclic excursions with a frequency ranging from 8 Hz to 60 Hz. In addition, when the system moves the optical head across many tracks, the focus must be maintained so that the system can count the number of track crossings. Also, in executing a track jump, the system must accelerate the actuator to some speed and then de-accelerate when the proper track location is reached. These movements instill forces on the actuator which generally displaces the tracking motor in the actuator to its utter most extreme and thereby disables it. These requirements necessitate an actuator to have a large range of motion and sensitivity to follow media deviations and to have a position sensor for the tracking motor to maintain integrity during the times of track jumps.

Two-dimensional objective lens positioning devices (actuators, hereafter) must ideally be compliant in two modes (i.e. tracking and focus motions) but noncompliant in all other modes. Additional modes may result from deviations caused by harmonic resonances or other mechanical play in the actuator. These resonances vibrate the objective lens, thereby degrading the reading and writing operations.

Typical actuators use a variety of suspension means. One type uses a slide on a post (see FIG. 1) and is described in U.S. Pat. No. 4,482,988. The two-dimensions are achieved by sliding an objective lens 3 up and down on a post 2 and rotating the lens about the post in the direction of arrows b. Rotational movement is caused by the interaction of coil 8 with magnet 9, while vertical movement is caused by the interaction of coil 5 with magnet 7. Actuators of this type are generally low performance because friction on the post causes nonlinearity, the large clearance between the post and the sliding cylinder causes beam deviations, and lastly, because of the rotational nature of the actuator, it has limited travel without beam clipping.

Other types of actuators, such as the one shown in FIG. 2, uses a spring suspension that eliminates nonlinearity and makes a stable system. One drawback is that the actuator could be compliant in more than two modes. Harmonic distortions could be instilled in the suspensions at certain frequencies to cause optical misalignment. In this type of actuator the travel of the tracking motor is also limited by beam vignetting.

The actuator of FIG. 2 is described in U.S. Pat. No. 4,538,882. An objective lens 200 can be moved right and left for tracking by the interaction of coils 202 and 204 with magnets 206 and 208, respectively. For vertical, focusing movement, a coil 210 interacts with magnets 212 and 214. Two pairs of leaf springs 216 on one side and two pairs of leaf springs 218 on another side provide a rhomboidal parallel arrangement to support the objective lens and provide compliancy in only two directions.

Another type of actuator moves the objective lens up and down with the first coil surrounding the optical path to the objective lens and at least a pair of additional coils on the sides of the objective lens for side to side movement. Such systems are shown in U.S. Pat. Nos. 4,135,206; 4,193,091 and 4,437,177. In the last patent, U.S. Pat. No. 4,437,177, the entire optical head, including the laser and detector, is moved side to side.

Other actuator designs attempt to simplify and reduce the weight of the moving part of the actuator by using only two coils, with the laser beam passing through each of the coils. In U.S. Pat. No. 4,092,529, coils are positioned at the top and the bottom of a tube holding the objective lens, with each coil interacting with a magnet in a different orientation to provide movements in orthogonal directions. However, a four wire suspension system is used which does not provide noncompliance in the nonfocusing and nontracking directions. U.S. Pat. No. 4,557,564 shows a tube which has two criss-crossed coils which interact with a single magnet and are energized in phase for focus error correction and out of phase for tracking error correction. The tube is supported by two pairs of angled leaf springs which also do not provide total noncompliance in the nonfocus and nontracking directions.

All of the above discussed prior art, with the exception of Watabe U.S. Pat. No. 4,437,177, move the objective lens sideways relative to the laser beam for tracking, which will cause beam distortion for large movements. Watabe avoids this by moving the entire optical head, which requires more power because of the larger mass being moved.

Another method for avoiding beam clipping is shown in U.S. Pat. No. 4,135,083, which uses a fiber optic cable to couple the laser beam to the focus and tracking actuator.

A position sensor for the tracking motor is required in high performance actuator applications. A prior art version of a position sensor is shown in FIG. 3 and is discussed in U.S. Pat. No. 4,851,466. This common configuration for position sensing uses a LED 176 as a light source and a split detector 178a, 178b. The LED is separated from the detector by a flag 172 with a narrow slit 174. In a middle position of the flag, the amount of light sensed by each half of the detector is the same. As the flag moves with the tracking motor, the detected signals from the split detector will not be balanced. Thus, the actual position of the tracking motor can be monitored. The tracking range that can be detected is determined by the width of the split detector.

SUMMARY OF THE INVENTION

The present invention is an actuator for an objective lens in an optical head which provides a compact structure that does not move the laser beam relative to the objective lens in the tracking mode. The low profile optical head design is accomplished by designing the optical beam path in the same space occupied by the tracking and focusing motor. A mirror reflects a laser beam from a laser at an angle to an objective lens. The objective lens and the mirror are coupled together in a manner allowing movement of the objective lens relative to the mirror along the path of a laser beam from the mirror to the objective lens. The objective lens, mirror and the coupling mechanism are all moved along the path of the laser beam between laser and the mirror for tracking control. Because the mirror moves with the objective lens, there is no beam clipping or beam distortion. For focusing, the objective lens is moved relative to the mirror.

The laser, the detector and their associated optics are stationary, with only the mirror and objective lens being moved, thus limiting the mass moved and the power requirements. The simple structure eliminates the need for a fiber optic cable.

Because the actuator uses a mirror to redirect a laser beam, compact horizontal, rather than vertical, mounting of the laser and detector is allowed.

In a preferred embodiment, the laser beam passes through a first coil which is coupled to the mirror to move it side to side for tracking through the coil's interaction with a permanent magnet. This assembly is the tracking actuator or tracking motor. A second coil on the opposite end of the mirror is coupled to the objective lens and to the first coil. The first coil interacts with a second permanent magnet to form the focusing actuator or focusing motor.

The present invention thus produces a light weight, fast actuator which is ideally suited for use with a compact holographic optical head, such as that disclosed in U.S. Pat. No. 4,731,772.

The tracking range of the preferred embodiment is greater than 1 mm and the focus range is greater than 1 mm. Even longer tracking ranges, such as 4 mm, can be achieved by this invention. Each motor is capable of producing an acceleration with an equivalent force of more than 10g.

In one embodiment the primary optical axis is perpendicular to the motion of the focus motor. A turning mirror is inserted within the focus motor to direct the laser beam to the objective lens. The focus motor uses two horizontal parallel leaf springs to move the objective lens in an up and down motion. The focusing assembly, including the turning mirror, the focus coil and the objective lens, is supported by another set of parallel leaf springs. When the tracking motor is activated, the turning mirror, the objective lens and the magnetic coil move in unison, thereby eliminating beam clipping and providing for increased tracking travel.

This invention also provides a position sensor to monitor the large range of travel by the tracking motor. This position sensor uses a flag assembly coupled to the tracking actuator placed between an LED-photodiode pair. On the flag is a piece of film with a variable density gradient. When the flag is moved by the actuator, the gradient blocks a variable amount of light reaching the photodiode. With the appropriate electrical means, this displacement can be translated into a current or voltage, thereby sensing position.

For fuller understanding of the nature and advantages of the invention, reference should be made to ensuing detailed description taken in conjunction with the accompanied drawings.

BRIEF DESCRIPTION OF DRAWINGS

FIG. 1 is a side sectional view of a prior art optical head with a two axis post actuator;

FIG. 2 is an exploded perspective view of a prior art optical head, with a two axis spring type actuator;

FIG. 3 is a side view of a prior art position sensor;

FIG. 4 is a perspective view of a preferred embodiment of an actuator according to the present invention;

FIG. 5 is a top elevational view of the embodiment of FIG. 4;

FIG. 6 is a side sectional view of the focus actuator suspension in the embodiment of FIG. 4;

FIG. 7 is a detailed, perspective view of the position sensor assembly in the embodiment of FIG. 4;

FIG. 8A is a diagram of a first embodiment of a mask used in the position sensor and FIG. 8B is a diagram of the variation in the position sensor signal with the mask of FIG. 8A;

FIG. 9A is a diagram of a second embodiment of a mask for the position sensor and FIG. 9B is a diagram of the position sensor output for the mask of FIG. 9A;

FIG. 10 is a top elevational view of the actuator of FIG. 4 with a first embodiment of a magneto-optic head;

FIG. 11 is a top elevational view of the actuator of FIG. 4 with a second embodiment of a magneto-optic head; and FIG. 12 is a perspective view of the embodiment of FIG. 4 adding a second tracking actuator with four coils.

DETAILED DESCRIPTION OF THE PREFERRED EMBODIMENTS

A first embodiment of an optical head with an actuator according to the present invention is shown in FIGS. 4, 5 and 6. FIG. 4 is a perspective view, while FIG. 5 shows the top view of the device. FIG. 6 shows the focus motor with the objective lens. In FIG. 4, a holographic laser optical head 28 (such as the one disclosed in U.S. Pat. No. 4,731,277) is used as the primary light source for writing, reading and servo errors sensing. With reference to FIG. 6, the collimating beam 29 from head 28 travels inside a rectangular tubular structure 42 until reflected upwards by a turning mirror 48 towards an objective lens 34. Objective lens 34 is mounted on a mechanical support 50 which is in turn attached to leaf springs 26 and 40.

Objective lens 34 is displaced in the vertical or focusing direction as a result of the interaction of the magnetic field generated by a coil 18 and the magnetic field generated by magnets 12 and 14 as shown in FIG. 4. Both magnets are supported by U-shape magnetic pole pieces 10 and 16. The magnets are high energy rare earth magnets. The poles are of sufficient mass to conduct the magnetic flux across the gap of the pole pieces and to direct the flux down and back to the other side of the magnet. The coil 18 is designed to allow movement in the vertical plane and restricted movement in all rotational planes by the action of leaf springs 26 and 40.

The number of windings in coil 18 is determined by the desired amount of force at some maximum amount of current. The force generated is shown by the equation:

$$F = BLI$$

where F is the force in newtons, B is the magnetic within the gap in telas, L is the length of wire in the gap in meters and I is the current in the wire in amperes.

For the unit to reproduce 10g of acceleration of a 1 gram mass, the force that would be needed would be approximately 0.1 Newtons.

With the objective lens 34 and coil 18 mounted on the same mechanical support, any vertical excursion of coil 18 will be translated into identical vertical excursions of objective lens 34. The dimensions of the leaf springs are chosen in such a way that they generate a natural frequency of 30 Hz in the focus mechanism when vibrated. The equations for determining the mechanical resonance frequency are given below:

$$f = (\tfrac{1}{2}\pi)(K/M)^{\tfrac{1}{2}},$$

$$K = 24EI/L^3,$$

where f is the resonance frequency in Hertz, K is the spring rate of the leaf springs in Newtons per Meter, M is the mass of the focusing optics and support structure in Kilograms, E is the modulus of the leaf spring material in Pascals and L is the length of each leaf spring in Meters.

Using the above equations, the leaf springs can be designed for a given configuration of optics and support structure to have a natural frequency of 30 Hz. This gives a resonant frequency within the expected operating range of the focus actuator, thus reducing the power required. By minimizing the weight of the moving member, the leaf springs can be thin and light, thereby reducing other mechanical resonances.

Referring still to FIG. 4, the tracking actuator consists of magnetic coil 46, magnets 36, 38, pole pieces 20, 22, leaf springs 24, 52, supporting tube 42 and the focus actuator. When a current is supplied to magnetic coil 46, a force is generated thereby from the interaction of the magnetic field in the coil and the magnetic flux lines generated in the magnetic circuits of magnets 36, 38 and pole pieces 20, 22. This generated force translates the tracking actuator in a horizontal direction. As seen by FIG. 4, any translation of magnetic coil 46 produces an equivalent translation of objective lens 34 and optical turning prism (mirror) 48. With turning mirror 48 coupled to objective lens 34, both optical components move in unison parallel to beam 29 generated by holographic optical head 28. In this embodiment of the present invention, the relative position of objective lens 34 and laser beam 29 remained fixed during the movement of the tracking actuator. This allows a long range of travel by the tracking actuator without misalignment between the laser beam and the objective lens.

This is in contrast to the prior art structures, such as that shown in FIG. 1, where the objective lens is moved relative to the laser beam. These prior art techniques work to some extent by the fact that the aperture of the objective lens is smaller than the beam diameter, thereby allowing for some tolerance of misalignment or dynamic adjustment. If the adjustment exceeds the tolerance, then beam clipping and beam degradation results. The present invention is not limited by this fact.

The embodiment of FIG. 4 includes a position sensing package. This position sensing device, as illustrated in FIG. 4 and shown in more detail in FIG. 7, uses a LED 32 as a light source, a flag 44 and a photo-detector 58. Flag 44 is coupled to tracking tube 42 which moves in unison with the tracking actuator. A mask 56 is attached to flag 44. In the embodiment of mask 56 shown in FIG. 8A, the optical transmission through the mask is a linear function of position as shown in FIG. 8B. With this mask placed between LED 32 and detector 58, the amount of light reaching the detector is dependent on the position of mask 56. The current output of the detector as a function of the position of the mask can be seen in FIG. 8B. The compromise that is made with this configuration is that the amount of light emitted by the LED must be controlled with precision. FIG. 9A shows a variant of the mask of FIG. 8A which produces the dual slope output shown in FIG. 9B. With this design both detection and zeroing can be determined using a split detector. By monitoring the output from the split detector; (a) direction can be determined by which detector has the greater output, (b) zero detection is obtained when both detectors have the same output.

FIG. 10 is another embodiment of an optical head that can take advantage of the actuator of the present invention. This optical system is designed for use in recording and reading signals from a magneto-optics recording medium. A holographic laser optical head 28 emits a collimated beam of laser light. In this configuration, a polarization beam-splitter 106 is interposed between the turning mirror and the optical head. As the laser beam is reflected from the magneto-optic medium, the recorded signal produces a light component which is reflected by the polarization beam-splitter 106 to a detector package 108. Most of the reflected light not related to the recorded signal is returned to the holographic laser optical head for sensing the focus and tracking errors. A more detailed description of such a magneto-optic head is set forth in co-pending application Ser. No. 141,459, hereby incorporated herein by reference.

FIG. 11 is yet another embodiment of the optical system for recording and reading signals on magneto-optics medium which can take advantage of the low profile actuator according to the present invention. In this embodiment the optical beam emitted by the holographic optical head 28 is assumed to be elliptical in shape. A beam shape correction prism 104 is used to expand the beam to a round beam which is then turned upwards by the turning mirror 48 and focused by the objective lens to the recording medium. This embodiment is to allow the use of an elliptical beam in optical recording and retrieval systems. This embodiment is shown in more detail in co-pending application Ser. No. 141,459.

FIG. 12 shows a modification to the embodiment of FIG. 4 in which four additional tracking coils 53 are added. These coils 53 are physically attached to focusing coil 18. Each of these coils is a small loop attached around a corner of coil 18 to give a motion in a direction orthogonal to that provided by coil 18 when it interacts with the adjacent magnets. These additional coils 53 act in concert with primary tracking coil 46. The reason for the additional coils is to prevent bending of leaf spring 26 by the action of coil 46 pushing on the leaf spring. Coils 53 add a pulling motion which cooperates with the pushing motion to prevent distortion of the leaf spring during high acceleration.

As will be understood by those familiar with the art, the present invention may be embodied in other specific forms without departing from the spirit or essential characteristics thereof. For example, the tracking coil 20 could be replaced by two tracking coils mounted on either side of the tube. This configuration would still move the mirror in conjunction with the objective lens. Accordingly, the disclosure of the preferred embodiment of the invention is intended to be illustrative, but not limiting, of the scope of the invention which is set forth in the following claims.

What is claimed is:

1. An actuator for focus and tracking movements of an objective lens relative to a fixed laser and photodetector in an optical head, comprising:
   an optical element for receiving a laser beam from said laser along a first path and reflecting said laser beam at an angle along a second path to said objective lens;
   a tube holding said optical element and a leaf spring coupling said objective lens to said tube, thereby allowing movement of said objective lens relative to said optical element along said second path while restricting movement in directions orthogonal to said second path;
   first means for moving said tube along said first path for tracking movements;
   second means for moving said objective lens relative to said optical element for focusing movements;
   a flag coupled to said tube and supporting a mask with a variable gradient for transmitting varying amounts of light depending upon position;
   a light source disposed on one side of said mask; and
   a photo sensor disposed on a second side of said mask.

2. An actuator for focus and tracking movements of an objective lens relative to a fixed laser and photodetector in an optical head, comprising:
   an optical element for receiving a laser beam from said laser along a first path and reflecting said laser beam at an angle along a second path to said objective lens;
   a tube holding said optical element and a leaf spring coupling said objective lens to said tube, thereby allowing movement of said objective lens relative to said optical element along said second path while restricting movement in directions orthogonal to said second path;
   first means for moving said tube along said first path for tracking movements;
   second means for moving said objective lens relative to said optical element for focusing movements; and
   a pair of leaf springs coupling said tube to a support structure for said laser and detector for allowing movement along said first path and restricting movement in directions orthogonal to said first path.

3. An apparatus, comprising:
   a support structure;
   an optical head mounted on said support structure, said optical head having a laser and a photodetector;
   an objective lens;
   an optical element for receiving a laser beam from said laser along a first path and reflecting said laser beam at an angle along a second path to said objective lens;
   means, coupled to said support structure, for coupling said objective lens and said optical element together allowing movement of said objective lens relative to said optical element along said second path while restricting movement between said objective lens and said optical element in directions orthogonal to said second path;
   a motor, having at least one electrically conducting coil, for moving the combination of said optical element and said means for coupling linearly along said first path for tracking movements, said laser beam travelling along said first path through said coil of said motor; and
   means for moving said objective lens relative to said optical element for focusing movements.

4. The apparatus of claim 3 wherein said angle is 90°.

5. The apparatus of claim 3 wherein said means for coupling comprises a tube holding said optical element and a leaf spring coupling said objective lens to said tube.

6. The apparatus of claim 5 wherein said second means for moving comprises a coil coupled to said leaf spring and at least one magnet for interacting with said coil.

7. The apparatus of claim 5 wherein said first means for moving comprises a coil coupled to said leaf spring and said tube and at least one magnet for interacting with said coil.

8. The apparatus of claim 3 wherein said optical element is a mirrored prism.

9. The apparatus of claim 3 further comprising:
   a diffraction grating disposed between said laser and said optical element to produce a diffracted beam from a reflected beam of said laser beam off a medium, said diffracted beam having an optical axis inclined relative to an optical axis of said reflected beam, said diffraction grating being patterned to produce a spacial variation in said diffracted beam responsive to variations in the focus of said laser beam on said medium; and
   said photodetector being configured for detecting said spacial variation in said diffracted beam, said photodetector being positioned to intercept said diffracted beam.

10. The apparatus of claim 3 wherein said optical head is a magneto-optical head for reading information recorded on a reflective medium, comprising:
    a laser pen for directing said laser beam having a first polarization to said optical element, said laser pen including a diffraction grating for producing a diffracted beam from a reflected beam of said laser beam off said medium for focus error detection;

a polarization beam-splitter mounted between said diffraction grating and said optical element for reflecting substantially all of a first component of said reflected beam having a second polarization orthogonal to said first polarization of said laser beam; and second photodetector means for detecting said reflected component.

11. The apparatus of claim 3 wherein said optical head is a magneto-optical head for reading information recorded on a reflective medium, comprising:

a laser pen for directing said laser beam to said optical element, said laser pen including a diffraction grating for producing a diffracted beam from a reflected beam of said laser beam off said medium for focus error detection;

a polarization beam-splitter mounted between said diffraction grating and said optical element for reflecting a substantial portion of a component of said reflected beam having a polarization orthogonal to said laser beam, transmitting to said diffraction grating a portion of a component of said reflected beam having the same polarization as said laser beam and reflecting a portion of said second component;

a second diffraction grating for producing a plurality of different beams from said reflected components;

second and third photodetectors for detecting beams from said second diffraction grating; and first and second depolarizes mounted between said second diffraction grating and said first and second photodetectors, respectively, said first polarizer transmitting light of a second polarization oriented approximately 45° with respect to said first polarization and said second polarizer transmitting light of a third polarization oriented approximately 90° with respect to said second polarization.

12. The apparatus of claim 3 wherein said optical head is a magneto-optical head for reading information recorded on a reflective medium, comprising:

said laser;

a diffraction grating disposed between said laser and said optical element to produce a diffracted beam from a reflected beam of said laser beam off said medium, said diffracted beam having an optical axis inclined relative to an optical axis of said reflected beam, said diffraction grating being patterned to produce a spacial variation in said diffracted beam responsive to variations in the focus of said laser beam on said medium;

said first-mentioned photodetector being configured for detecting said spacial variation in said diffracted beam, said first photodetector being positioned to intercept said diffracted beam;

a polarization beam-splitting mounted between said diffraction grating and said optical element for reflecting substantially all of a component of said reflected beam having a polarization orthogonal to said laser beam; and a second photodetector for detecting said reflected component.

13. An actuator for focus and tracking movements of an objective lens relative to a fixed laser and photodetector in an optical head, comprising:

an optical element for reflecting a laser beam at an angle;

a first wire coil coupled to said optical element so that said laser beam passes through the center of said wire coil on a first side of said optical element;

a second coil positioned on a second side of said optical element and coupled to said objective lens so that said laser beam, after being reflected by said angle, passes through a center of said second coil and said objective lens;

first resilient means for supporting said first wire coil and said optical element, allowing movement along a first path of said laser beam on said first side of said optical element;

second resilient means for coupling said second coil and said objective lens to said first coil, allowing movement along a second path of said laser beam on said second side of said optical element;

a first permanent magnet positioned to interact with said first coil to cause movement of said first coil along said first path; and a second permanent magnet positioned to interact with said second coil to cause movement of said second coil along said second path.

14. An actuator for focus and tracking movements of an objective lens relative to a fixed laser and photodetector in an optical head, comprising:

a mirrored prism for reflecting a laser beam received on a first path from said laser at a right angle along a second path to said objective lens;

a tube supporting said mirrored prism and having an opening adjacent said prism for allowing said laser beam on said second path to pass, said tube having a first open end for receiving said laser beam on said first path;

first and second leaf springs coupled to said tube for supporting said tube;

third and fourth leaf springs coupled to said objective lens and to each other at a first end;

a first, tracking coil coupled to said first end of said tube and a second end of said third and fourth leaf springs;

a first magnet for interacting with said first, tracking coil for moving said tube, prism, third and fourth leaf springs and objective lens parallel to said first path;

a second, focusing coil coupled to one of said third and fourth leaf springs; and a second magnet for interacting with said second, focusing coil for producing relative movement of said objective lens with respect to said prism parallel to said second path.

15. The actuator of claim 14 further comprising a plurality of additional tracking coils coupled to said focusing coil and positioned to interact with said second magnet to move said tube in a direction parallel to said first path in cooperation with said first tracking coil.

16. An apparatus comprising:

an objective lens;

an optical head having a laser and photodetector;

an optical element for reflecting a laser beam at an angle;

a first wire coil coupled to said optical element so that said laser beam passes through the center of said wire coil on a first side of said optical element;

a second coil positioned on a second side of said optical element and coupled to said objective lens so that said laser beam, after being reflected by said angle, passes through a center of said second coil and said objective lens;

first resilient means for supporting said first wire coil and said optical element, allowing movement along a first path of said laser beam on said first side of said optical element;

second resilient means for coupling said second coil and said objective lens to said first coil, allowing movement along a second path of said laser beam on said second side of said optical element while restricting movement between said objective lens and said optical element in directions orthogonal to said second path;

a first permanent magnet positioned to interact with said first coil to cause movement of said first coil along said first path; and a second permanent magnet positioned to interact with said second coil to cause movement of said second coil along said second path.

17. An actuator for focus and tracking movements of an objective lens relative to a fixed laser and photodetector in an optical head, comprising:

a mirrored prism for reflecting a laser beam received on a first path from said laser at a right angle along a second path to said objective lens;

a tube supporting said mirrored prism and having an opening adjacent said prism for allowing said laser beam on said second path to pass, said tube having a first open end for receiving said laser beam on said first path;

first and second leaf springs coupled to said tube for supporting said tube;

third and fourth leaf springs coupled to said objective lens and to each other at a first end allowing movement of said objective lens along said second path while restricting movement between said objective lens and said optical element in directions orthogonal to said second path;

a first, tracking coil coupled to said first end of said tube and a second end of said third and fourth leaf springs;

a first magnet for interacting with said first, tracking coil for moving said tube, prism, third and fourth leaf springs and objective lens parallel to said first path;

a second, focusing coil coupled to one of said third and fourth leaf springs; and a second magnet for interacting with said second, focusing coil for producing relative movement of said objective lens with respect to said prism parallel to said second path.

18. The actuator of claim 17 further comprising a plurality of additional tracking coils coupled to said focusing coil and positioned to interact with said second magnet to move said tube in a direction parallel to said first path in cooperation with said first tracking coil.

* * * * *